US012574973B2

(12) United States Patent
Dong

(10) Patent No.: US 12,574,973 B2
(45) Date of Patent: Mar. 10, 2026

(54) COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 310 days.

(21) Appl. No.: 18/036,101

(22) PCT Filed: Nov. 12, 2020

(86) PCT No.: PCT/CN2020/128437
§ 371 (c)(1),
(2) Date: May 9, 2023

(87) PCT Pub. No.: WO2022/099551
PCT Pub. Date: May 19, 2022

(65) Prior Publication Data
US 2023/0413334 A1 Dec. 21, 2023

(51) Int. Cl.
*H04W 74/08* (2024.01)
*H04W 74/0833* (2024.01)

(52) U.S. Cl.
CPC ............................... *H04W 74/0833* (2013.01)

(58) Field of Classification Search
CPC . H04L 27/2602; H04L 5/0094; H04L 5/0007; H04L 5/001; H04W 74/0833; H04W 74/006; Y02D 30/70
See application file for complete search history.

(56) References Cited

U.S. PATENT DOCUMENTS

| | | | |
|---|---|---|---|
| 2016/0080043 A1* | 3/2016 | Tian | H04L 5/0007 |
| | | | 375/267 |
| 2016/0301452 A1* | 10/2016 | Kwon | H04B 7/0634 |
| 2017/0196010 A1* | 7/2017 | Matsuo | H04W 72/542 |
| 2018/0109300 A1 | 4/2018 | Choi et al. | |
| 2018/0199271 A1 | 7/2018 | Viger et al. | |
| 2018/0255570 A1 | 9/2018 | Patil et al. | |
| 2018/0302923 A1 | 10/2018 | Patil et al. | |
| 2019/0007977 A1 | 1/2019 | Asterjadhi et al. | |
| 2019/0014538 A1 | 1/2019 | Patil et al. | |

(Continued)

FOREIGN PATENT DOCUMENTS

| | | |
|---|---|---|
| CN | 107925470 A | 4/2018 |
| CN | 109803413 A | 5/2019 |

(Continued)

OTHER PUBLICATIONS

3GPP tsg_ran\WG3_lu, SGR3_89bis NEC,R3-152076 "Stage-2: Implementing Class-1 NAS Message Reroute procedure" (2015).
3GPP tsg_ran\WG2_RL2,TSGR2_62 NSN (Rapporteur), R2-082193 "System Information, Mobilty, QoS and miscellaneous updates" (2008).

*Primary Examiner* — Brian D Nguyen
(74) *Attorney, Agent, or Firm* — Volpe Koenig

(57) ABSTRACT

A communication method. The communication method may include: determining a first message frame, where the first message frame includes at least one of first information and second information, where the first information indicates a single resource unit for random access, and the second information indicates a multi resource unit for random access; and sending the first message frame.

18 Claims, 3 Drawing Sheets

Determine a first message frame ~ 210

Send the first message frame ~ 220

(56) References Cited

U.S. PATENT DOCUMENTS

| | | | | |
|---|---|---|---|---|
| 2021/0021322 A1* | 1/2021 | Kuo | ...................... | H04L 5/0048 |
| 2021/0176188 A1 | 6/2021 | Fang et al. | | |
| 2021/0243137 A1* | 8/2021 | Kurian | ................ | H04L 47/2483 |
| 2021/0314749 A1* | 10/2021 | Kwak | ...................... | H04W 4/40 |
| 2021/0314926 A1 | 10/2021 | Liu et al. | | |
| 2021/0352663 A1* | 11/2021 | Hedayat | ............ | H04W 72/0446 |
| 2021/0360655 A1* | 11/2021 | Kwak | .................. | H04L 5/0048 |
| 2022/0272772 A1 | 8/2022 | Ko et al. | | |
| 2022/0345275 A1* | 10/2022 | Hu | ..................... | H04W 72/0453 |
| 2023/0023486 A1* | 1/2023 | Lim | .................. | H04W 72/1273 |
| 2023/0327805 A1* | 10/2023 | Park | ...................... | H04L 1/0059 |
| | | | | 370/338 |
| 2023/0345523 A1* | 10/2023 | Jang | .................... | H04W 74/002 |
| 2024/0073878 A1* | 2/2024 | Park | ................. | H04W 72/0453 |

FOREIGN PATENT DOCUMENTS

| | | | |
|---|---|---|---|
| CN | 110115093 A | 8/2019 |
| CN | 110521251 A | 11/2019 |
| CN | 110730050 A | 1/2020 |
| CN | 110831238 A | 2/2020 |
| CN | 108353416 B | 8/2021 |
| GB | 201908801 D0 | 7/2019 |
| WO | 2017172279 A1 | 10/2017 |
| WO | 2018160262 A1 | 9/2018 |
| WO | 2019010046 A1 | 1/2019 |
| WO | 2019010400 A1 | 1/2019 |

* cited by examiner

Communication device 500

Communication module 510

Processing module 520

Fig. 5

COMMUNICATION METHOD AND COMMUNICATION DEVICE

CROSS REFERENCE TO RELATED APPLICATION

The present application is a U.S. National Stage of International Application No. PCT/CN2020/128437, filed on Nov. 12, 2020, the contents of all of which are incorporated herein by reference in their entirety for all purposes.

BACKGROUND

In the IEEE802.11be standard, a multi-RU (MRU) may be allocated for a station supporting the IEEE802.11be standard each time, and thus, an existing mechanism cannot meet the requirements in the IEEE802.11be standard.

SUMMARY

The disclosure relates to the field of communication, in particular to a communication method and a communication device in wireless communication.

Examples of the disclosure provide the following solutions.

According to an example of the disclosure, a communication method is provided. The communication method may be applied to an access point and may include: determining a first message frame, the first message frame including at least one of first information and second information, the first information being information indicating a single resource unit for random access, and the second information being information indicating a multi-resource unit for random access; and sending the first message frame.

According to an example of the disclosure, a communication method is provided. The communication method may be applied to a station and may include: receiving a first message frame, the first message frame including at least one of first information and second information, the first information being information indicating a single resource unit for random access, and the second information being information indicating a multi-resource unit for random access; and executing a random selection of a resource unit according to the first message frame.

According to an example of the disclosure, an electronic device is provided. The electronic device includes a memory, a processor, and a computer program stored on the memory and executable by the processor. The processor implements the above method when the computer program is executed.

According to an example of the disclosure, a non-transitory computer-readable storage medium is provided. A computer program is stored on the non-transitory computer-readable storage medium. The computer program implements the above method when the computer program is executed by a processor.

BRIEF DESCRIPTION OF THE DRAWINGS

The examples of the disclosure are described in detail, referring to accompanying drawings, and the above and other features of the examples of the disclosure will be more apparent.

FIG. 5 shows a block diagram of another communication device according to an example.

DETAILED DESCRIPTION

Figure 1:
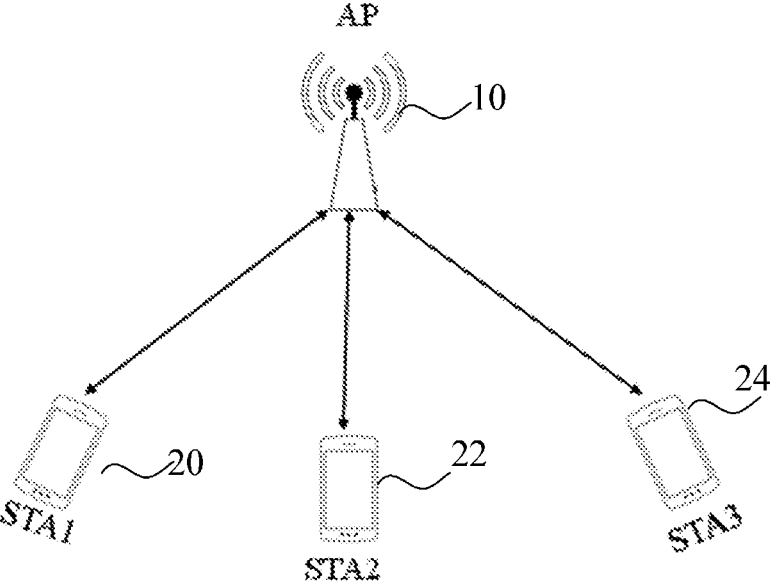
FIG. 1 shows an example diagram of a wireless communication scene.

The following description of reference accompanying drawings is provided to help comprehensively understand various examples of the disclosure limited by the appended claims and their equivalents. The various examples of the disclosure include various specific details, but these specific details are merely considered as examples. In addition, for clarity and conciseness, the description of known technologies, functions, and constructions may be omitted.

Terms and words used in the disclosure are not limited to a written meaning, but are merely used by an inventor, so as to clearly and consistently understand the disclosure. Thus, descriptions of the various examples of the disclosure are provided for illustrative purposes merely and not for restrictive purposes for those skilled in the art.

It needs to be understood that singular forms "one", "a", "said", and "the" used here may also include a plural form unless otherwise the context clearly indicates. It needs to be further understood that the word "include" used in the disclosure refers to an existing described feature, integer, step, operation, element, and/or component, but does not exclude the existence or addition of one or a plurality of other features, integers, steps, operations, elements, components, and/or groups of them.

It will be understood that although the terms "first", "second", and the like may be used for describing various elements in the article, these elements are not limited by these terms. These terms are used for distinguishing one element from another element. Thus, under the condition of not deviating from the instruction of the examples, a first element discussed below may be called a second element.

It needs to be understood that in response to determining that the element is called "connected" or "coupled" to another element, the element may be directly connected or coupled to other elements, or a middle element may also exist. In addition, "connect" or "couple" used here may include wireless connection or wireless coupling. The term "and/or" or an expression "at least one in . . . /at least one" includes any or all combinations of one or a plurality of related listed items.

Unless otherwise defined, all terms (including technical terms and scientific terms) used here have the same meaning as that commonly understood by those ordinarily skilled in the art to which the disclosure pertains.

Institute of electrical and electronic engineers (IEEE) set up a task group (TG) IEEE802.11be to study the next generation (IEEE802.11a/b/g/n/ac) Wi-Fi technology, the study range is bandwidth transmission of 320 MHz, aggregation and collaboration of a plurality of frequency bands and the like, it is expected to increase the speed and throughput by at least four times compared to an existing IEEE802.11ax standard, and a primary application scene is video transmission, augmented reality (AR), virtual reality (VR) and the like.

The aggregation and collaboration of the plurality of frequency bands refer to the communication between devices in 2.4 GHz, 5.8 GHz, and 6-7 GHz frequency bands at the same time, and the communication between the devices in the plurality of frequency bands at the same time needs to define a novel media access control (MAC) mechanism for management. In addition, low-time delay transmission is further expected to be supported in IEEE802.11be.

In discussion of the IEEE802.11be standard, the largest supported bandwidth is 320 MHz (160 MHz+160 MHz), and in addition, 240 MHz (160 MHz+80 MHz), and the bandwidth supported in the IEEE802.11ax standard may further be supported.

Transmission of time sensitive network (TSN) data will be supported in the IEEE802.11be standard, and the time delay is generally needed to be smaller than or equal to 1 ms; or transmission of data such as AR/VR is supported, and the time delay is generally needed between 1 ms and 10 ms; and in addition, for the transmission of data of interactive videos or automatic drive control, the time delay is generally between 10 ms and 50 ms.

In an existing standard (such as the IEEE802.11ax standard), a trigger frame is adopted to allocate uplink transmission resources for a user. In the existing standard (such as the IEEE802.11ax standard), for a station not obtaining uplink resources, a mechanism of UORA (uplink OFDMA random access) is adopted to access resources, and each station randomly selects a single resource unit (single RU) each time.

However, in the IEEE802.11be standard, a multi-RU (MRU) may be allocated for a station supporting the IEEE802.11be standard each time, and thus, an existing mechanism cannot meet requirements in the IEEE802.11be standard.

FIG. 1 shows an example diagram of a wireless communication scene.

In a wireless local area network, a basic service set (BSS) may consist of an access point (AP) 10 and one or a plurality of stations (STAs) 20, 22, 24 in communication with the AP. It will be understood that the station (STA) may also be referred to as a non-AP device. The basic service set may be connected to a distribution system (DS) through its AP, and then connected to another basic service set to form an extended service set (ESS).

The AP is a wireless switch for a wireless network, and also a kernel of the wireless network. The AP device may be used as a wireless base station, and is mainly used for connecting the wireless network and a bridge of a wired network. By using the access point (AP), the wired and wireless networks may be integrated.

As an example, the AP may include a software application and/or a circuit, so that other types of nodes in the wireless network may be in communication with an exterior and an interior of the wireless network through the AP. For example, the AP may be a terminal device or a network device provided with a wireless fidelity (Wi-Fi) chip.

As an example, the station (STA) may include but is not limited to: a cell phone, a smart phone, a wearable device, a computer, a personal digital assistant (PDA), a personal communication system (PCS) device, a personnel information manager (PIM), a personal navigation device (PND), a global positioning system, a multimedia device, an internet of things (IoT) device, etc.

Although FIG. 1 illustrates that one AP 10 is in communication with three stations (STA1 20, STA2 22 and STA3 24), it is merely illustrated, the examples of the disclosure are not limited to this, for example, the AP and the station may have any quantity and/or any type.

In order to support the requirements of an IEEE802.11be standard, the examples of the disclosure redefine information for a UORA mechanism, and may meet a communication environment of coexisting of a station ("an IEEE802.11be station" for short below) supporting IEEE802.11be standard and a station ("an IEEE802.11ax station" for short below) supporting an IEEE802.11ax standard. Although it is merely described that the IEEE802.11be station coexists with the IEEE802.11ax station in the communication environment, the examples of the disclosure are not limited to this; for example, stations supporting an IEEE802.11ac standard and the like may further exist.

Figure 2:
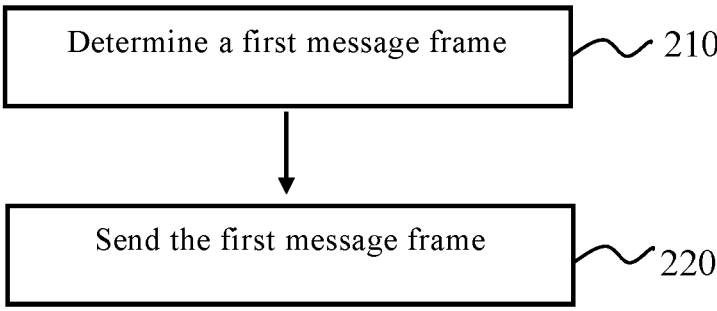
FIG. 2 shows a flow diagram of a communication method according to an example.

FIG. 2 shows a flow diagram of a communication method according to an example. The communication method shown in FIG. 2 may be applied to an access point.

Referring to FIG. 2, in step 210, a first message frame may be determined. In the example of the disclosure, there may be a plurality of ways to determine the first message frame, for example, the access point may generate the first message frame according to at least one of following conditions: a network condition, a load condition, hardware capacity of sending/receiving devices, a business type and a related agreement stipulation; and the example of the disclosure is not specifically limited. In the example of the disclosure, the access point may further obtain the first message frame from an external device, and the example of the disclosure is not specifically limited.

A resource unit of uplink transmission may be allocated for a user through the first message frame. According to the example of the disclosure, the first message frame may be a trigger frame, but the disclosure is not limited to this, and other frames for resource distribution may also be feasible. In the following, for a convenient description, the trigger frame is taken as an example to describe the first message frame.

For example, the trigger frame for allocating the uplink transmission resource for the user may have an example format shown in Table 1 below:

TABLE 1

| Trigger frame format | | | | | | | | |
|---|---|---|---|---|---|---|---|---|
| | MAC header ↔ | | | | | | | |
| | Frame Control | Duration | RA | TA | Common Info | User Info List | Padding | FCS |
| Octets: | 2 | 2 | 6 | 6 | 8 or more | variable | variable | 4 |

An example format of a user information (user info) field in Table 1 may be shown in Table 2 below:

TABLE 2

| User info field format | | | | | | | | |
|---|---|---|---|---|---|---|---|---|
| B0 B11 AID12 Associated identifier | B12 B19 RU Allocation | B20 UL FEC Coding Type | B21 B24 UL HE-MCS (Modulation coding scheme) | B25 UL DCM | B26 B31 SS Allocation/ RA-RU Information | B32 B38 UL Target RSSI | B39 Reserved | Trigger Dependent User Info |
| Bits: 12 | 8 | 1 | 4 | 1 | 6 | 7 | 1 | variable |

The associated identifier (AID12) in Table 2 defines the condition of the resource unit allocated for the user. Example encodings of the AID12 may be shown as Table 3 below:

TABLE 3

AID12 subfield encoding

| AID12 subfield | Description |
|---|---|
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| 2047-4094 | Reserved |
| 4095 | Start of Padding field |

Referring to Table 3, in response to determining that the encoding in the AID12 is 0 or 2045, it is indicated that a user info field may be used for a station for a random selection of a resource unit. In the description of the example of the disclosure, the associated STA refers to a station establishing an associated connection with the AP, temporarily storing data but not obtaining uplink transmission resources; and the unassociated STA refers to a station not establishing an associated connection with the AP, temporarily storing data but not obtaining uplink transmission resources.

An RA-RU (RU for random access) information subfield in the user info field (Table 2) may be used for identifying information of RA-RU for a station for a random selection of a resource unit. The example format may be shown as in Table 4 below:

TABLE 4

RA-RU information subfield format

| | B26 B30 | B31 |
|---|---|---|
| | Number of RA-RU | More RA-RU |
| Bits: | 5 | 1 |

It may be understood that each element in the table of the disclosure is self-existent; these elements are listed in the same table as examples, but it does not represent that all elements in the table need to exist at the same time as shown in the table. A value of each element does not depend on a value of any other element in Table 1. Those skilled in the art may understand that a value of each element in the table of the disclosure is an independent example.

A number of RA-RU subfield indicates a number of continuous RUs allocated for UORA. A value of the number of the RA-RU subfields is equal to the number of the continuous RA-RUs minus 1. The More RA-RU subfields is set to 1 to indicate that in the user info field, the RA-RU type indicated by the AID12 subfield is allocated (exists) in the trigger frame sent later, until the end of the target wake time (TWT) service period (SP) in which the trigger frame carrying the field is sent. Otherwise, the More RA-RU subfield is set to 0. In response to determining that the More Tigger Frame (TF) subfield in the Common Info field in Table 1 is set to 0, the More RA-RU subfield is reserved.

In a UORA mechanism, the AP uses an OFDMA contention window (OCW) field to assign a scope of a random number to a station. Then the random selection of the resource unit is performed based on the random number of the station selected in the scope and the number of RA-RU in the trigger frame sent by the AP. The UORA mechanism is not described in detail in the example of the disclosure, so as to avoid an indistinct inventive concept of the disclosure needlessly.

According to the example of the disclosure, the first message frame may include at least one of first information and second information, the first information is information indicating a single resource unit for random access, and the second information is information indicating a multi-resource unit for random access. For example, the single resource unit for random access (RA-RU) may be a 26-tone, a 52-tone, a 106-tone, a 242-tone, a 484-tone, a 996-tone and the like. According to the example of the disclosure, an example of the multi-resource unit for random access (RA-MRU) may be a 52+26 tone, a 106+26 tone, a 106+52 tone, a 484+242 tone, a 996+484 tone, a 996+484+242 tone, a 2×996 tone, a 4×996 tone, a 2×996+484 tone, a 3×996 tone, a 3×996+484 tone, etc.

Specifically, the first information may be the content shown in the above Table 2 and Table 3, for example, the AID12 subfield in Table 2 and the RA-RU information subfield in Table 3 are used for allocating a single resource unit for the associated station or the unassociated station. In the example of the disclosure, the second information may be expansively included and used for allocating a multi-resource unit for the associated station or the unassociated station. For example, a variable field in Table 2 may be used for extending the RA-MRU (the multi-resource unit for random access) information subfield. It will be understood that the first message frame may simultaneously include both the first information and the second information, and may also merely include one of the two. For example, in response to determining that the single resource unit is allocated for all the stations (the IEEE802.11be station and the IEEE802.11ax station), the first message frame may merely include the first information, and in response to determining that the multi-resource unit is merely needed to be allocated for the IEEE802.11be station, the first message frame may merely include the second information.

According to the example of the disclosure, the first message frame may be identified (parsed) by the IEEE802.11be station, and may also be identified (parsed) by the IEEE802.11ax station, so as to be suitable for a coexisting communication environment of the IEEE802.11be station and the IEEE802.11ax station.

According to the example of the disclosure, the second information may include a first identifier and a second identifier, for example, the RA-MRU information subfield is shown in Table 5 below:

TABLE 5

| RA-MRU Info subfield | |
| --- | --- |
| Number of RA-MR | More RA-MRU |

According to the example of the disclosure, the first identifier indicates the number of the multi-resource unit for random access, such as "the number of RA-MRU" in the Table 5. In an example, the number of the multi-resource unit for random access may correspond to the number of a continuous multi-resource unit, and in another example, the number of the multi-resource unit for random access may correspond to the number of a discontinuous multi-resource unit. The access point may determine and inform the station of related information of the multi-resource unit according to the hardware capacity, the communication environment and the like.

In an example, each multi-resource unit for random access may consist of at least two single resource units, such as a 52+26 tone, a 106+26 tone, a 106+52 tone, a 484+242 tone, a 996+484 tone, a 996+484+242 tone, a 2×996 tone, a 4×996 tone, a 2×996+484 tone, a 3×996 tone, a 3×996+484 tone, etc.

According to the example of the disclosure, the second identifier may indicate that whether the multi-resource unit for random access is included in the second message frame sent after the first message frame in step 210, such as "more RA-MRU" in Table 5.

According to the example of the disclosure, the second information may further include a third identifier. Specifically, the third identifier may indicate that the multi-resource unit for random access is randomly selected by which type of station, for example, the third identifier may be an encoded value in the AID12. The third identifier will be described in detail in the following condition II later.

Since the IEEE802.11ax station merely randomly selects the single resource unit, for the IEEE802.11be station, the single resource unit may be randomly selected, the multi-resource unit may further be randomly selected, and an example of the first message frame in response to determining that the access point allocates the resource unit for the IEEE802.11be station will be mainly described in detail below. In the example of the disclosure, the condition of coexisting of the IEEE802.11be station and the IEEE802.11ax station is considered.

I. The IEEE802.11be station randomly selects a single resource unit

Under the condition, the information shown from Table 1 to Table 5 may be reused, that is, the first information (such as the user info, AID12 and the number of RA-RU defined in the above Table 1 to Table 4) in the first message frame is used for allocating the single resource unit for the associated station or the unassociated station. In response to determining that the station receives the first message frame, the random selection of the single resource unit may be performed according to the first information.

In other words, under the condition that the IEEE802.11be station randomly selects a single resource unit, a format of the same user info field in the IEEE802.11ax standard will be adopted to perform RU allocation on the station (not obtaining uplink resources) has been associated with the AP or has not been associated with the AP, and then, the station randomly selects an RU.

II. The IEEE802.11be station randomly selects a multi-resource unit

Under the condition, the second information in the first message frame may be used for allocating the multi-resource unit for the associated station or the unassociated station. In response to determining that the station receives the first message frame, the random selection of the composite resource may be performed according to the second information.

According to the example of the disclosure, in order to avoid wasting of resources, preferably, the multi-resource unit for random access may be in the 160 MHz, the 240 MHz, the 160+160 or 320 MHz bandwidth, however, this is merely an example, and bandwidths with other sizes are also feasible.

As mentioned above, each multi-resource unit for random access consists of at least two single resource units. According to the example of the disclosure, the multi-resource unit for random access may be divided into a multi-resource unit (such as the 52+26 tone, the 106+26 tone, 106+52 tone, etc.) with a small size and a resource unit (such as the 484+242 tone, the 996+484 tone, 996+484+242 tone, the 2×996 tone, the 4×996 tone, the 2×996+484 tone, the 3×996 tone, the 3×996+484 tone, etc.) with a larger size. Considering that the multi-resource unit with the larger size occupies abundant bandwidths, wasting of resources may be generated for random access, in response to determining that the access point allocates the multi-resource unit for the associated station or the unassociated station, the multi-resource unit with the larger size is not allocated for the station for random selection, and merely the multi-resource unit with the small size is allocated for the station for random selection. In an example, in each multi-resource unit for random access, the number of subcarriers in each single resource unit forming the multi-resource unit is smaller than or equal to a fifth value. According to the example of the disclosure, the fifth value is a value determined according to the bandwidth occupied by the resource unit, for example, the fifth value may be 106, however, this is merely an example, and the example of the disclosure is not limited to this.

According to the example, the multi-resource unit for random selection may be carried in the first message frame (such as an RU allocation subfield), and the plurality of multi-resource units may be allocated for the station for random selection through index numbers of the multi-resource units under the bandwidths. The access point and the station may obtain the index numbers of the multi-resource units through various ways, which is not specifically limited in the disclosure.

In an example, for the associated station, the access point may allocate a plurality of MRUs for the station for random selection. In the example, in response to determining that the station is associated with the access point, the first identifier (the number of RA-MRU in Table 5) in the second information may be set as a first value, so as to indicate that the number of multi-resource units for random access is greater than 1. In other words, in the example, the first identifier (the number of RA-MRU in Table 5) is set as the first value to indicate that the plurality of MRUs exist for the station for random selection.

In another example, for the unassociated station, the access point may allocate one or the plurality of MRUs for the station for random selection. In the example, in response to that the station is unassociated with the access point, the first identifier (the number of RA-MRU in Table 5) in the second information may be set as a second value, so as to indicate that the number of multi-resource units for random access is equal to or greater than 1. In other words, in the example, the first identifier (the number of RA-MRU in Table 5) is set as the second value to indicate that one or plurality of MRUs exist for the station for random selection. In addition, as another example, for the unassociated station, the access point may also use the first information to allocate the single resource unit, specifically, may refer to the descriptions from Table 1 to Table 5, and for conciseness, repeated description is omitted here.

The first value or the second value of the first identifier may be determined according to the hardware capacity of the AP or the communication environment; the example of the disclosure is not specifically limited to this.

In response to determining that the access point allocates the multi-resource units for the associated station and the unassociated station, a third identifier (such as AID) in the second information may be complementarily defined, so as to indicate that the multi-resource unit for random access is randomly selected by which type of station.

In an example, in response to determining that the access point allocates the multi-resource units for the associated station (namely under the condition of the station for random access being the station associated with the access point), the third identifier may be set as a third value, and the third value is different from an associated identifier value set for the single resource unit for random access. In other words, in response to determining that the access point allocates the multi-resource units for the associated station, a novel encoded value may be defined in the third identifier (AID12) to correspond to the multi-resource unit MRU, that is, the novel encoded value defined in the third identifier (AID12) may be different from 0, 1-2007 and 2045 in Table 3, for example, the third value set in the third identifier (AID12) may be 2047, it will be understood that it is merely an example, the example of the disclosure is not limited to this, and other values capable of distinguishing the type of stations and the type of resources are also feasible.

In another example, in response to determining that the access point allocates the multi-resource units for the unassociated station (namely under the condition of the station for random access being the station unassociated with the access point), the third identifier (AID12) may be set (encoded) as a fourth value different from the third value. In an example, in response to determining that the access point allocates the multi-resource units for the unassociated station, the fourth value may be different from the third value, and may also be different from an associated identifier value set for the single resource unit for random access. In another example, in response to determining that the access point allocates the multi-resource units for the unassociated station, the fourth value may be different from the third value, but may reuse the format in Table 3, that is, the fourth value may be the same as the associated identifier value set for the single resource unit for random access, such as 2045 in Table 3.

In other words, under the condition that the IEEE802.11be station randomly selects a multi-resource unit, the plurality of MRUs may be allocated for the associated station, so that the station performs random selection, and at the same time, one or the plurality of MRUs may be allocated for the unassociated station, so that the station performs random selection. The specific principle is that 1, considering that the MRU with the larger size occupies the abundant bandwidths, so the MRU with the larger size is not allocated to the unassociated station & associated station for use; and 2, the MRU with the small size is allocated to the associated station for use, a single RU is allocated to the unassociated station, and the specific format may be shown in the above Table 5.

As an example, in the first message frame (such as a trigger frame), a value of AID is self-defined to correspond to the associated station and the unassociated station; for example, AID-2047 identifies an associated station.

As an example, the format of the RA-MRU info is that under the 160 MHz, 240 MHz or 160+160/320 MHz bandwidths, the plurality of MRUs with the small sizes may be allocated to the associated station, and the specific format may be shown in the above Table 5. Referring to Table 5, as an example, the number of RA-MRU identifies the number of allocated continuous MRUs, and more RA-MRU identifies whether RA-MRU is included in the next trigger frame.

As an example, for the unassociated station, the IEEE802.11ax standard format may be reused, one RA-RU is merely allocated, and the corresponding AID=2045.

Returning back to FIG. 2, in step 220, the first message frame determined in step 210 may be sent to, for example, the station. As mentioned above, in response to determining that the first message frame is received, the station may randomly select the resource unit according to the random number selected by the UORA mechanism within the scope assigned by the AP and the first information and/or the second information in the first message frame. The UORA mechanism is not described in detail in the example of the disclosure, so as to avoid an indistinct inventive concept of the disclosure needlessly.

Figure 3:
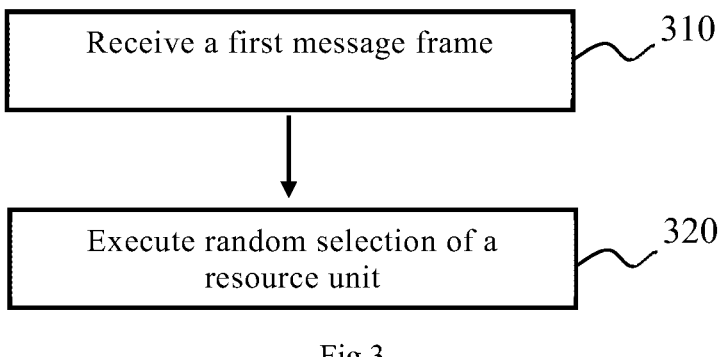
FIG. 3 shows a flow diagram of another communication method according to an example.

FIG. 3 shows a flow diagram of another communication method according to an example. The communication method shown in FIG. 3 may be applied to a station.

Referring to FIG. 3, in step 310, the station may receive a first message frame. The first message frame may include at least one of first information and second information, the first information is information indicating a single resource unit for random access, and the second information is information indicating a multi-resource unit for random access. The first information and the second information may be similar to the description of step 210 in FIG. 2 and Table 2 to Table 5, and for conciseness, the repeated description is omitted here.

In step 320, the access point may execute the random selection of the resource unit according to the first message frame. For example, the station may randomly select the resource unit according to the random number selected by the UORA mechanism within the scope assigned by the AP and the first information and/or the second information in the first message frame. The UORA mechanism is not described in detail in the example of the disclosure, so as to avoid an indistinct inventive concept of the disclosure needlessly.

According to the example, in response to determining that the station is associated with the access point, the multi-resource unit may be selected from the plurality of multi-resource units for random access based on the first identifier in the second information.

According to the example, in response to that the station is unassociated with the access point, the multi-resource unit is selected from one or the plurality of multi-resource units for random access based on the first identifier in the second information.

The communication method shown in FIG. 2 and FIG. 3 according to the example of the disclosure redefines (extends) the message frame allocating uplink transmission resources, which may be suitable for a coexisting communication environment of the IEEE802.11be station and the IEEE802.11ax station, transmission resources are allocated to the station temporarily storing data but not obtaining the uplink resources for random selection, the frequency utilization efficiency is improved, and the throughput of the system is increased.

Figure 4:
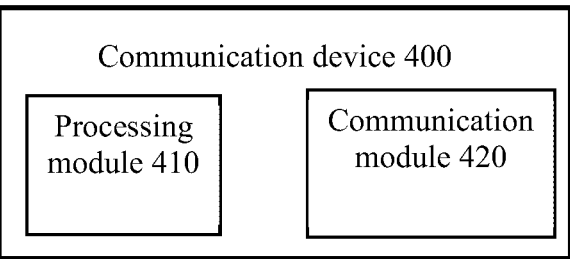
FIG. 4 shows a block diagram of a communication device according to an example.

FIG. 4 shows a block diagram of a communication device according to an example. The communication device shown in FIG. 4 may be applied to an access point.

Referring to FIG. 4, the communication device 400 may include a processing module 410 and a communication module 420.

The processing module 410 may be configured to: determine a first message frame. According to the example, the first message frame may include at least one of first information and second information, the first information is information indicating a single resource unit for random access, and the second information is information indicating a multi-resource unit for random access. The first information and the second information in the first message frame may be similar to the description referring to FIG. 2 and Table 2 to Table 5. In order to achieve conciseness, repeated description is omitted here. The communication module 420 may be configured to send the first message frame.

The communication device in FIG. 4 may execute the communication method described referring to FIG. 2, and in order to achieve conciseness, repeated description is omitted here. In addition, the communication device 400 shown in FIG. 4 is merely an example, the example of the disclosure is not limited to this, for example, the communication device 400 may further include other modules, for example, a memory module and the like. In addition, each module in the communication device 400 may be combined into a more complex module, or may be divided into more independent modules.

Figure 5:
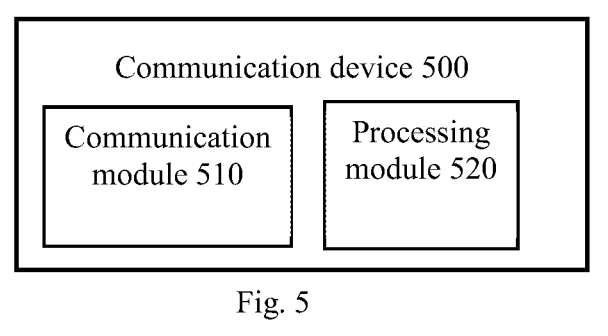

FIG. 5 shows a block diagram of another communication device according to an example. The communication device shown in FIG. 5 may be applied to an access point.

Referring to FIG. 5, the communication device 500 may include a communication module 510 and a processing module 520.

The communication module 510 may be configured to receive a first message frame. According to the example, the first message frame may include at least one of first information and second information, the first information is information indicating a single resource unit for random access, and the second information is information indicating a multi-resource unit for random access. The first information and the second information in the first message frame may be similar to the description referring to Table 2 to Table 5. For conciseness, repeated description is omitted here.

The processing module 520 may be configured to execute the random selection of a resource unit according to the first message frame. For example, the processing module 520 may perform random selection of the resource unit according to a UORA mechanism based on the number of random selected within a scope assigned by an AP and the first information and/or the second information in the first message frame.

According to the example, in response to determining that a station is associated with the access point, the processing module 520 may be configured to select a multi-resource unit from a plurality of multi-resource units for random access based on a first identifier in the second information.

According to the example, in response to that a station is unassociated with the access point, the processing module 520 may be configured to select a multi-resource unit from one or a plurality of multi-resource units for random access based on a first identifier in the second information.

The communication device in FIG. 5 may execute the communication method described referring to FIG. 3, and in order to achieve conciseness, repeated description is omitted here. In addition, the communication device 500 shown in FIG. 5 is merely an example, the example of the disclosure is not limited to this, and for example, the communication device 500 may further include other modules, such as a memory module. In addition, each module in the communication device 500 may be combined into a more complex module, or may be divided into more independent modules.

The communication device shown in FIG. 4 and FIG. 5 according to the example of the disclosure redefines (extends) the message frame allocating uplink transmission resources, which may be suitable for a coexisting communication environment of the IEEE802.11be station and the IEEE802.11ax station, and the throughput of the system is increased.

Based on the principle the same as the method provided by the example of the disclosure, an example of the disclosure further provides an electronic device, and the electronic device includes a processor and a memory. The memory stores a machine readable instruction (may also be called "a computer program"); and the processor is configured to execute the machine readable instruction to implement the method described in FIG. 2 and FIG. 3.

An example of the disclosure further provides a computer readable storage medium, a computer program is stored on the computer readable storage medium, and the computer program implements the method described in FIG. 2 and FIG. 3 in response to determining that the computer program is executed by a processor.

In the example, the processor may be a logical block, a module and a circuit for implementing or executing various examples described in the disclosure, such as a central processing unit (CPU), a general purpose processor, a digital signal processor (DSP), an application specific integrated circuit (ASIC), a field programmable gate array (FPGA) or other programmable logic devices, transistor logic devices, hardware components or any combination of them. The processor may also be a combination for implementing a calculating function, such as a combination containing one or a plurality of microprocessors, a combination of a DSP and a microprocessor, etc.

In the example, the memory may be, for example, a read only memory (ROM), a random access memory (RAM), an electrically erasable programmable read only memory (EEPROM), a compact disc read only memory (CD-ROM), or other optical disk memories, optical disk memories (including a compress optical disk, a laser optical disk, an optical disk, a digital general optical disk, a blue-ray optical disk, etc.), a disk storage medium or other magnetism storage devices, or any other media capable of carrying or storing program codes having an instruction or a data structural form and capable of being stored and accessed by a computer, which is not limited to this.

It needs to be understood that steps in the flow diagram of accompanying drawings are successively displayed according to an indication of an arrow, but these steps are not inevitably successively executed according to a sequence indicated by the arrow. Unless expressly stated in the article, execution of these steps does not have a strict sequence limitation, which may be executed according to other sequences. In addition, at least part of steps in the flow diagram of the accompanying drawings may include a plurality of substeps or a plurality of stages, these substeps or stages are not inevitably executed at the same moment, but may be executed at different moments, the execution sequence is not also inevitably successively performed, and may be in turn or alternately executed with other steps or at least part of the substeps or stages of other steps.

Although the disclosure has been shown and described according to some examples of the disclosure, those skilled in the art will understand that various changes may be made in forms and details within the scope of the disclosure. Thus, the scope of the disclosure is not limited to the example, but is limited by the attached claims and their equivalents.

What is claimed is:

1. A communication method, performed by an access point, comprising:

determining a first message frame, wherein the first message frame comprises first information and second information, wherein the first information indicates a single resource unit for random access, and the second information indicates a multi-resource unit for random access; and sending the first message frame, and wherein the second information comprises a first identifier, and the first identifier indicates a number of multi-resource units for random access.

2. The communication method according to claim 1, wherein a station is associated with the access point, and a value of the first identifier is a first value to indicate the number of the multi-resource units for random access being greater than 1.

3. The communication method according to claim 1, wherein a station is unassociated with the access point, and a value of the first identifier is a second value to indicate the number of the multi-resource units for random access being equal to or greater than 1.

4. The communication method according to claim 1, wherein the second information further comprises a second identifier, wherein the second identifier indicates whether a second message frame comprises the multi-resource unit for random access, wherein the second message frame is sent after the first message frame.

5. The communication method according to claim 1, wherein the second information comprises a third identifier, wherein the third identifier indicates that the multi-resource unit for random access is randomly selected by which type of station.

6. The communication method according to claim 5, wherein the station is associated with the access point, and a value of the third identifier is a third value; and wherein the third value is different from a value of an associated identifier set for the single resource unit for random access.

7. The communication method according to claim 6, wherein the station is unassociated with the access point, and the value of the third identifier is a fourth value different from the third value.

8. The communication method according to claim 1, wherein one multi-resource unit for random access consists of at least two single resource units.

9. The communication method according to claim 8, wherein in one multi-resource unit for random access, a number of subcarriers in one single resource unit is smaller than or equal to a fifth value.

10. The communication method according to claim 1, wherein the multi-resource unit for random access is in a 160 MHz, 240 MHz, (160+160) MHz or 320 MHz bandwidth.

11. A non-transitory computer readable storage medium, wherein a computer program is stored on the non-transitory computer readable storage medium, and the method according to claim 1 is implemented when the computer program is executed by a processor.

12. A communication method, performed by a station, comprising:

receiving a first message frame, wherein the first message frame comprises first information and second information, wherein the first information indicates a single resource unit for random access, and the second information indicates a multi-resource unit for random access; and performing a random selection of a resource unit according to the first message frame, and wherein the second information comprises a first identifier, wherein the first identifier indicates a number of multi-resource units for random access.

13. The communication method according to claim 12, further comprises:

selecting, in response to determining that the station is associated with a access point, a multi-resource unit from a plurality of multi-resource units for random access based on the first identifier.

14. The communication method according to claim 12, further comprises:

selecting, in response to determining that the station is unassociated with the access point, a multi-resource unit from one or a plurality of multi-resource units for random access based on the first identifier.

15. The communication method according to claim 12, wherein the second information further comprises a second identifier, wherein the second identifier indicates whether a second message frame comprises the multi-resource unit for random access, wherein the second message frame is sent after the first message frame.

16. A communication device, comprising a memory, a processor and a computer program stored on the memory and executable on the processor, wherein the processor implements the method according to claim 12 when the computer program is executed.

17. A non-transitory computer readable storage medium, wherein a computer program is stored on the non-transitory computer readable storage medium, and the method according to claim 12 is implemented when the computer program is executed by a processor.

18. A communication device, comprising a memory, a processor and a computer program stored on the memory and executable on the processor, wherein when the computer program is executed by the processor, the processor is caused to:

determine a first message frame, wherein the first message frame comprises first information and second information, wherein the first information indicates a single resource unit for random access, and the second information indicates a multi-resource unit for random access; and send the first message frame, and wherein the second information comprises a first identifier, and the first identifier indicates a number of multi-resource units for random access.

\*    \*    \*    \*    \*